No. 894,914. PATENTED AUG. 4, 1908.
G. L. STOOKEY & J. J. TANNER.
SURFACE PLOW, WEEDER, AND GRUBBER.
APPLICATION FILED AUG. 5, 1907.
2 SHEETS—SHEET 1.
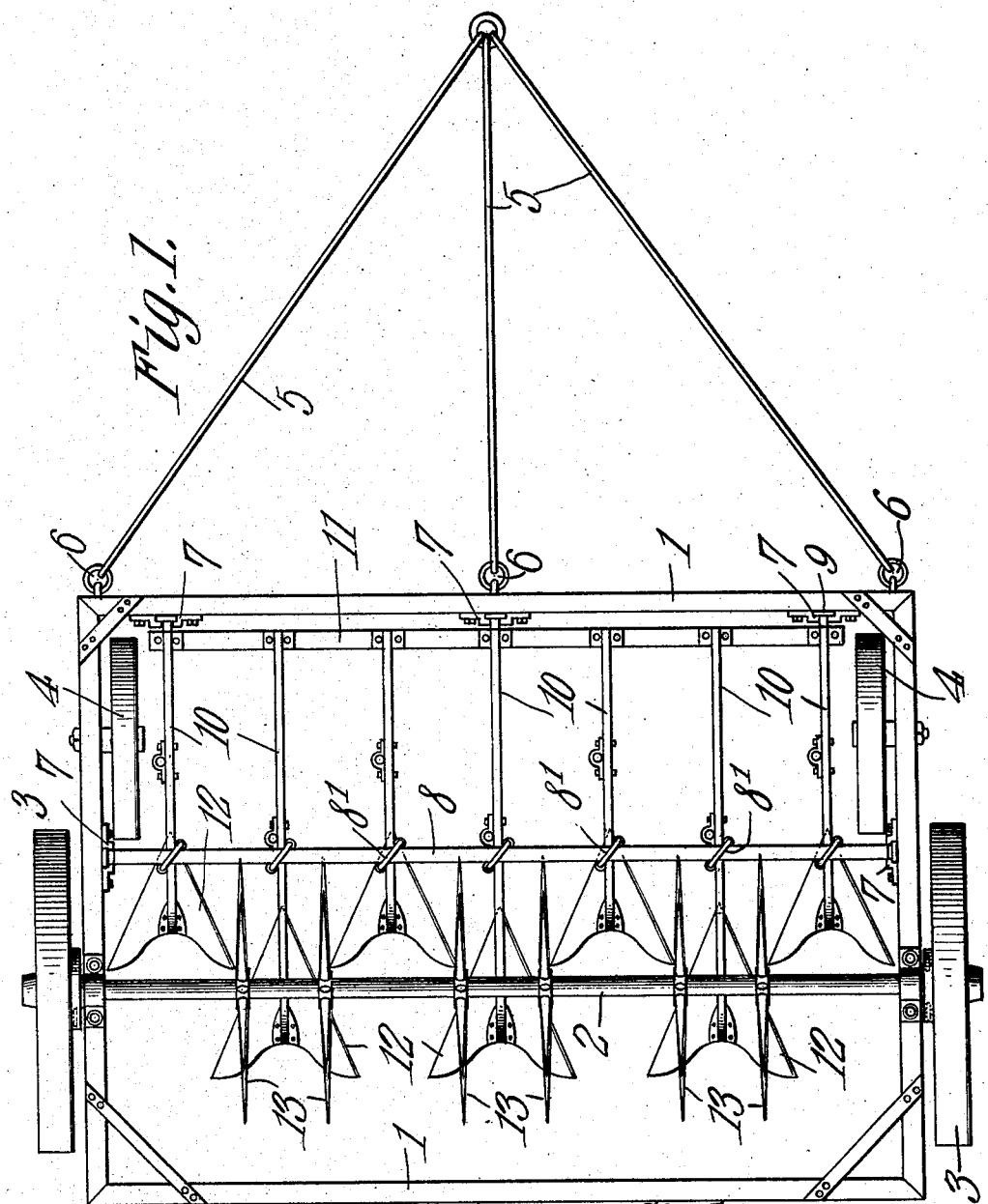
WITNESSES:
George L. Stookey
Joseph J. Tanner INVENTORS
By C. A. Snow & Co.
ATTORNEYS

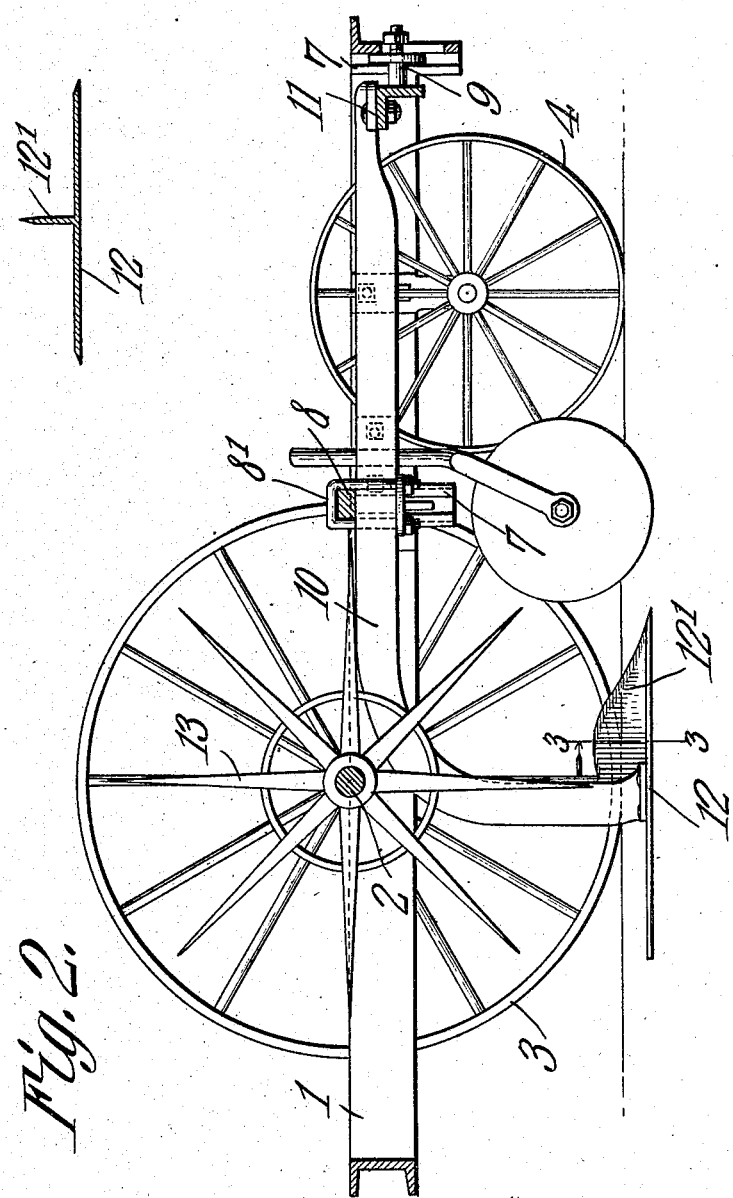

UNITED STATES PATENT OFFICE.

GEORGE L. STOOKEY, OF LEHI, AND JOSEPH JUNIUS TANNER, OF CLOVER, UTAH.

SURFACE PLOW, WEEDER, AND GRUBBER.

No. 894,914.      Specification of Letters Patent.      Patented Aug. 4, 1908.

Application filed August 5, 1907. Serial No. 387,081.

*To all whom it may concern:*

Be it known that we, GEORGE L. STOOKEY and JOSEPH JUNIUS TANNER, citizens of the United States, residing, respectively, at Lehi and Clover, in the counties of Utah and Toole and State of Utah, have invented a new and useful Surface Plow, Weeder, and Grubber, of which the following is a specification.

This invention has relation to surface plows and weeders and it consists in the novel construction and arrangement of its parts as hereinafter shown and described.

The object of the invention is to provide an implement of simple and cheap construction which is especially adapted for tilling the soil at its surface and for cutting roots lying just below the surface.

The implement consists primarily of a series of horizontal blades arranged in staggered relation in the line of draft and a series of actiniform members mounted upon a shaft which is journaled for rotation the said members being adapted to keep the blades free of brush and vegetation.

In the accompanying drawing:—Figure 1 is a top plan view of the plow, Fig. 2 is a side elevation of the same, and Fig. 3 is a transverse sectional view of one of the blades cut on the line 3—3 of Fig. 2.

The implement consists of the frame 1 to which is journaled the axle 2 and the ground wheels 3 are located at the ends of the axle 2 and have ratchet engagement therewith. The forward portion of the frame is supported by the ground wheels 4 and the draft rods 5 are attached to the forward portion of the frame 1 and are connected with the rings 6. The frame 1 is provided with the vertically disposed guides 7, some of which are located at the forward side of the frame while others are located at the lateral side thereof. The bar 8 rests at its ends in those guides 7 located at the lateral sides of the frame 1 while the projections 9 lie in those guides 7 located at the front of the frame 1. The said guides are provided with suitable set screws or equivalent securing devices for fixing those parts lying therein. The plow beams 10 are connected together at their forward ends by a bar 11 and the bar 8 connects the intermediate portions of the said beams together, the U-clamps 8′ being used upon the bar 8. Said beams are arranged alternately long and short as illustrated and a blade 12 is attached to the rear end of each beam. The said blades are horizontally disposed and are of cuneiform configuration in plan with the upstanding ribs 12′. The outer edges of each blade overlaps the outer edges of the adjacent blades in the line of draft of the implement. The actiniform members 13 are located upon the axle shaft 2 and rotate with the same. The said members 13 lie in planes occurring approximately midway between the beams 10 and are adapted to prevent trash and vegetation from accumulating upon the beams.

From the foregoing description it is obvious that a simple and effective root cutter and surface plow is provided and that the beams and plows may be adjusted vertically whereby the distance at which they will operate below the surface may be regulated and the said beams may be elevated to such an extent as to raise the blades above the surface, the last said adjustment being desirable when the implement is transported from place to place.

Having described our invention what we claim as new and desire to secure by Letters-Patent is:—

An implement as described comprising a frame, a wheel supported axle shaft journaled thereon, actiniform members mounted upon the shaft, long and short plow beams alternately arranged, said axle shaft being located above and between the rear ends of the long and short beams, blades attached to said beams and having their adjacent edges overlapping in the line of draft of the implement, said actiniform members operating in planes between the overlapping edges of the blades.

In testimony that we claim the foregoing as our own, we have hereto affixed our signatures in the presence of two witnesses.

GEORGE L. STOOKEY.
    JOSEPH JUNIUS TANNER.

Witnesses for G. L. Stookey:
    G. N. CHILD,
    L. E. ADAMS.
Witnesses for J. J. Tanner:
    E. HUME TALBERT,
    C. E. S. COYLE.